VIDEO CIRCUITS FOR COLOR TELEVISION RECEIVERS

Filed Dec. 20, 1966 2 Sheets-Sheet 1

INVENTORS
ROLAND N. RHODES &
ALBERT MACOVSKI
BY Donald N. Timbie
ATTORNEY

May 5, 1970 R. N. RHODES ET AL 3,510,573

VIDEO CIRCUITS FOR COLOR TELEVISION RECEIVERS

Filed Dec. 20, 1966 2 Sheets-Sheet 2

INVENTORS
ROLAND N. RHODES &
ALBERT MACOVSKI
BY Donald N. Timbie
ATTORNEY 3,510,573

VIDEO CIRCUITS FOR COLOR TELEVISION RECEIVERS

Roland Norman Rhodes, Indianapolis, Ind., and Albert Macovski, Palo Alto, Calif., assignors to RCA Corporation, a corporation of Delaware Filed Dec. 20, 1966, Ser. No. 603,317
Int. Cl. H04n 9/12
U.S. Cl. 178—5.4 5 Claims

ABSTRACT OF THE DISCLOSURE

A composite signal amplifier for video signals employs a detector poled to provide a composite video signal having deflection synchronizing pulses extending in a positive direction with respect to the other components of the signal. The detector is bootstrapped across the grid to cathode circuit of a first vacuum tube video amplifier and the cathode is used to supply drive to sync and A.G.C. circuits. A delay line is coupled between the plate electrode of the first amplifier and a grid electrode of a second amplifier. The second amplifier's grid is coupled to another detector for providing a D.C. potential thereto in accordance with the low frequency components present in the composite signal.

Figure 1:
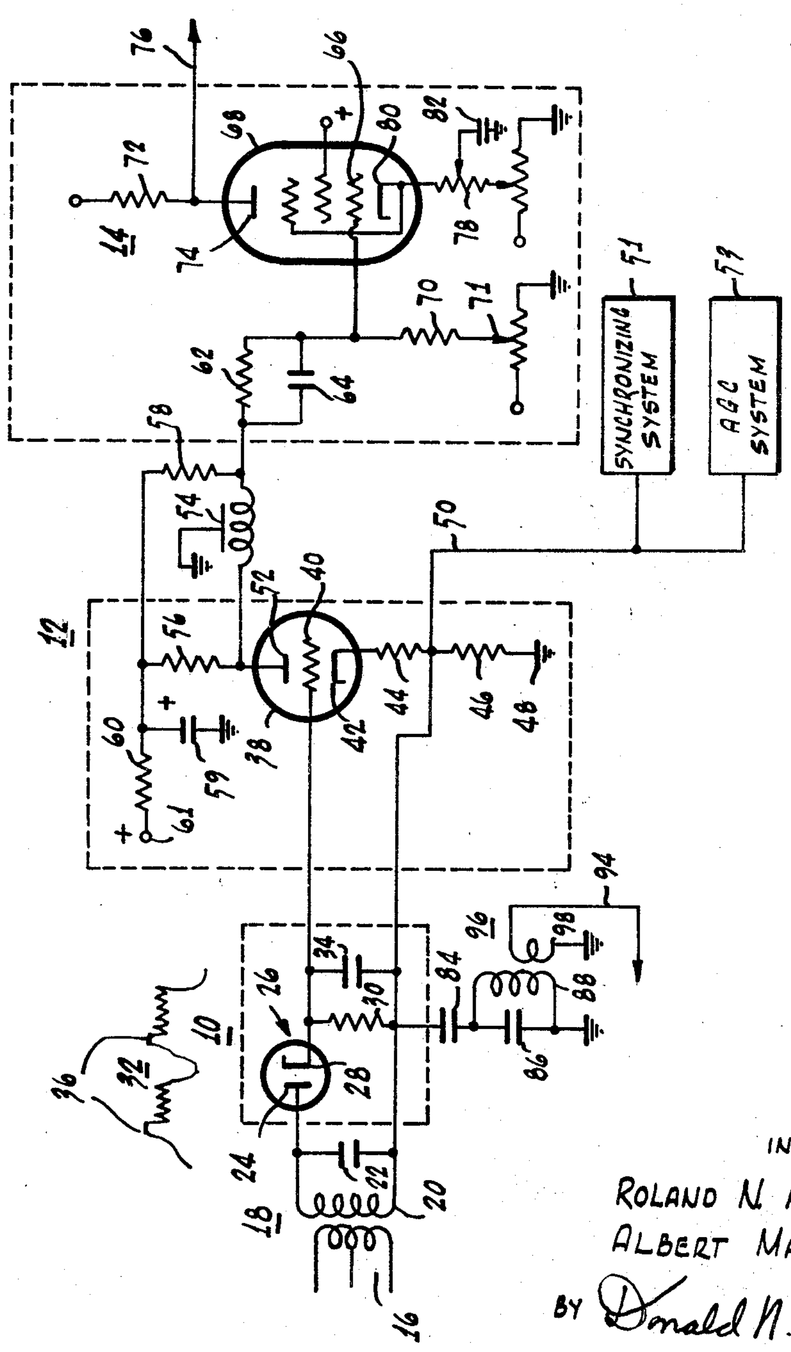

This invention relates to improvements in circuits in a color television receiver that detect the composite video signal and provide its various components with suitable amplification for application to various portions of the receiver.

The composite video signal includes a luminance component, a chrominance signal, deflection synchronizing pulses and bursts of several cycles of a reference wave for detecting the chrominance signals. In most color television receivers, the entire composite video signal, with some high frequency attenuation, is applied to the brightness control electrodes of an image forming means after being time delayed and amplified in what is generally termed a luminance channel. It is, of course, necessary that the composite signal at the output of the luminance channel have a proper polarity. Amplification must also be provided for the deflection synchronizing pulses, the bursts and the chrominance signal, and it is desirable to utilize at least a portion of the amplification capability of the luminance channel for this purpose.

The deflection synchronizing pulses are also used in many receivers as the measure of received signal strength in keyed automatic gain control systems. In view of the fact that most deflection synchronizing systems and most keyed automatic gain control systems respond to deflection synchronizing pulses extending in a positive direction, it is desirable in order to avoid the use of costly polarity inversion means, that the amplification provided in the luminance channel be such as to produce this polarity.

Cathode ray tubes presently used to form the color image must be driven with a luminance signal having a larger voltage amplitude range than that used for monochrome cathode ray tubes, and, if low cost amplifiers are to be used in the luminance channel, it is necessary to operate them over such a large portion of their range as to introduce nonlinearity in the amplified luminance signal.

Previous circuits for performing some or all of those functions have either introduced nonlinearity in the luminance channel or have utilized additional components that substantially increased the cost.

It is, therefore, another object of this invention to provide improved, inexpensive video circuits that produce more linear amplification in the luminance channel.

It is another object of this invention to provide improved, inexpensive video circuits for a color television receiver, that have the capability of performing the various operations on the composite video signal noted above in such manner as to provide more linear amplification in the luminance channel.

The first objective can be attained in accordance with this invention by utilizing video circuits including only two stages of amplification in the luminance channel which are coupled in cascade relation via a time delay means in such manner that the inherent nonlinearity produced in the luminance signal by each of the amplifiers employed is in compensating relationship and by utilizing a second detector that produces a composite video signal of such polarity that the synchronizing pulses cause an increase of current in the amplifier to which it is coupled.

The second objective is attained by additionally providing the first cascaded amplifier with two output load impedances connected in such manner that the amplified signals appearing across them have opposite polarity.

In some previous video circuits utilizing two stages of amplification in the luminance channel, the arrangement has been such that the inherent capacity of the amplifier at the electrode to which the output of the time delay means is coupled has been sufficient to introduce an undesirable attenuation of the higher frequencies in the luminance channel.

It is, accordingly, a further object of this invention to provide video circuits which are capable of attaining the objectives noted above and which, in addition, produce amplification in the luminance channel in such manner that the higher frequencies are not undesirably attenuated.

In other previously known video circuits, a floating second detector circuit has been used in such manner that it cannot be provided with a sufficiently low alternating current impedance to ground to prevent "tweets" without utilizing additional impedances for isolating the second detector circuit from the luminance amplifier, or without reducing the amplitude of the higher frequencies of the luminance signal if such isolating impedances are not used.

Therefore it is another object of the invention to provide improved video circuits having a floating second detector circuit that can be provided with a sufficiently low alternating current impedance to ground to prevent tweets without requiring impedances for isolating the second detector circuit from the luminance amplifier and without reducing the amplitude of the luminance signal.

Figure 2:
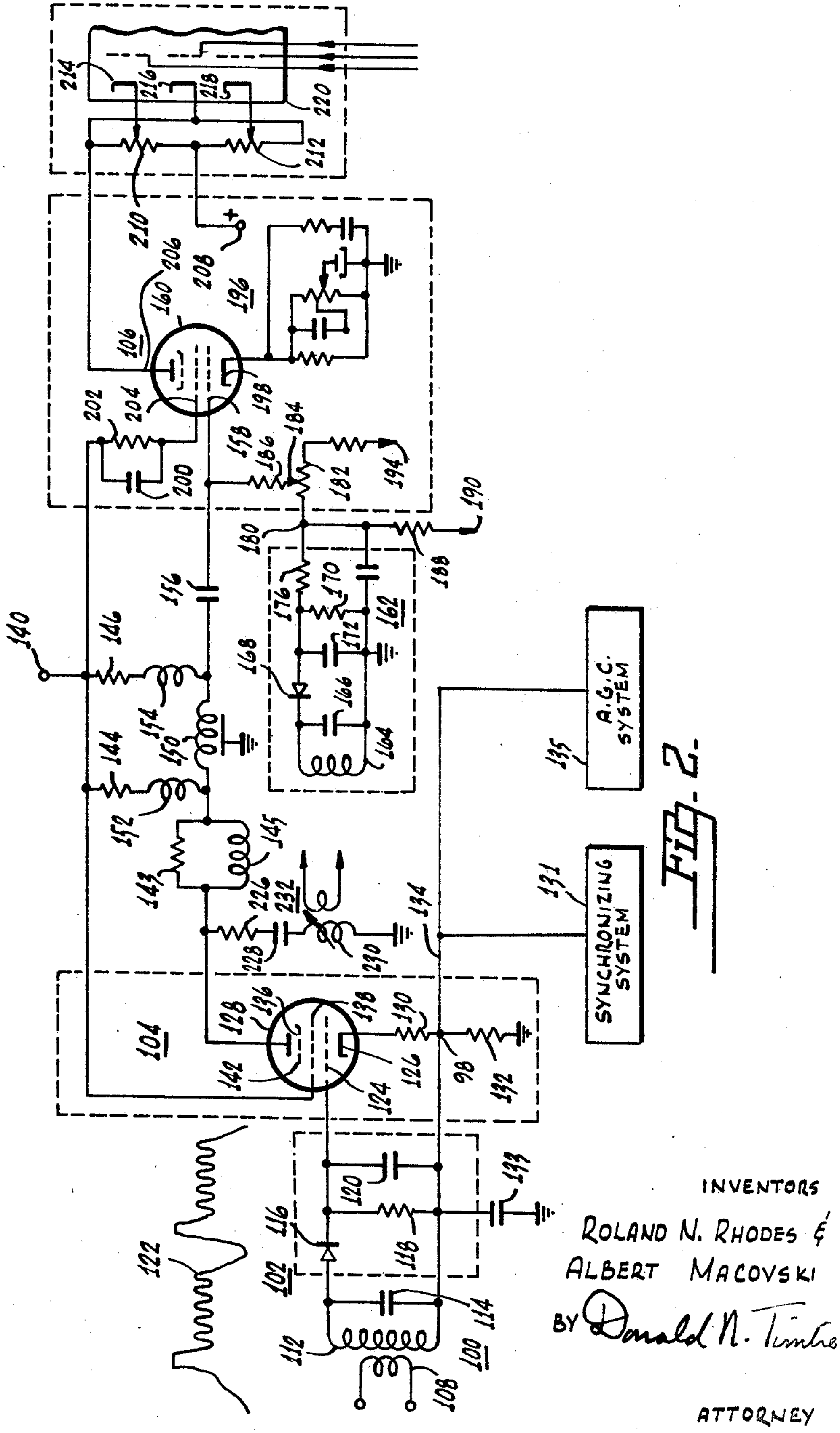

The invention, as set forth in the claims appended hereto, as well as other objects and advantages thereof, will be readily apparent after consideration of the following detailed description taken in conjunction with the drawings in which:

FIG. 1 is a schematic representation of video circuits of the invention in which the two amplifiers in the luminance channel are direct current coupled, and in which the first amplifier is a triode, and FIG. 2 is a schematic representation of video circuits of the invention in which the two amplifiers in the luminance channel are alternating current coupled and in which the first amplifier is a pentode.

In FIG. 1 a second detector circuit 10, and luminance amplifying stages 12 and 14 are coupled in accordance with this invention. An intermediate frequency carrier that is amplitude modulated by the composite video signal is supplied by the last stage of the intermediate frequency amplifier (not shown) across a primary winding 16 of an intermediate frequency coupling transformer 18. The secondary winding 20 of the transformer 18 may be tuned to resonance in the approximate center of the band of intermediate frequencies representing the video signals by a capacitor 22 connected in shunt therewith. An anode 24 of a unilateral current conducting device, herein shown as being a diode 26, is connected to one side of the secondary winding 20, and its cathode 28 is connected in series with a load resistor 30 and the other side of the secondary winding 20, so that the composite video signal 32 appears at the cathode end of the load resistor 30 with the deflection synchronizing pulses extending in a positive direction. Bypassing of the intermediate frequencies is accomplished by a capacitor 34 connected in shunt with the load resistor 30.

The composite video signal 32 is coupled to input electrodes of an amplifying device of the amplification stage 12 in such manner that the deflection synchronizing pulses 36 increase the current flow therein. Whereas transistors or other types of amplifiers could be used, the amplifier illustrated in the circuit is a triode 38, having a grid 40, as one input electrode, connected to the end of the load resistor 30 at the cathode 28, and having a cathode 42, as the other input electrode, connected via a degeneration and biasing resistor 44 to the other end of the load resistor 30.

Amplification of the composite video signal with the synchronizing pulses extending in a positive direction, as is required for most AGC and synchronizing systems, is attained by connecting a cathode load resistor 46 between a point of reference potential such as ground 48 and the end of the degeneration resistor 44 that is remote from the cathode 42. An output lead 50 is connected to the junction of the resistors 44, 46 for supplying at least the low frequency portion of the composite video signal, and in particular, the deflection synchronizing pulses to a scanning synchronizing system 51, and, if desired, to a keyed automatic gain control system 53.

The anode 52 of the triode 38 is connected to one end of a delay line 54. Terminating resistors 56 and 58 are connected in series across the delay line 54. A capacitor 59 is connected between their junctions and ground, and a direct current load resistor 60 is connected between the junction and a point 61 of positive potential. Delay lines having suitable bandwidth also have a characteristic impedance of about several thousand ohms, and in order to avoid reflections, each of the resistors 56, 58, which form the terminating impedances for the delay line 54, should have a resistance equal to the characteristic impedance. Because the capacitor 59 provides a low impedance to ground the load impedance at the anode 52 for alternating current signals is formed by the resistors 56, 58 and the delay line 54, and will have an impedance that is less than the value of the resistance of either of the resistors 56, 58. However, the load impedance for direct current signals is greater as it includes the resistor 60 in series with the parallel terminating resistors 56, 58.

The output end of the delay line 54 is coupled via a parallel connection of a resistor 62 and capacitor 64 to a control grid 66 of a pentode amplifier 68. In order to provide a negative voltage at the grid 66, it is connected via a resistor 70 to a moveable tap 71 of a potentiometer, which serves as a brightness control having one end connected to a point of negative potential and the other to ground. It will be noted that the resistors 62 and 70 reduce the direct current component by voltage divider action, but because of the presence of the capacitor 64, the alternating current components are not reduced in any substantial degree. However, it will be recalled that the direct current component of the signal was accentuated by the resistor 60, so that the overall action of the circuit is such as to maintain a reasonable relationship between the alternating current and direct current components of the video signal.

The desired amplified and delayed composite video signal having a polarity such that the deflection synchronizing pulses extend in a positive direction appears across a load resistor 72 that is connected between a point of positive operating potential and the anode 74 of the amplifier 68, and may be supplied to the cathodes of the cathode ray tube via an output lead 76.

Contrast control of the luminance signal is achieved by connection of a potentiometer 78 between the cathode

80 of the amplifier 68 and a point of reference potential and by connection of a bypass capacitor 82 between the moveable tap 84 and the point of reference potential.

Chrominance signals can be taken from the cathode 42, the grid 40 or the anode 52 of the triode amplifier 38, but in this particular circuit they are taken from the junction of the degeneration resistor 44 and the cathode load resistor 46 by the connection of two capacitors 84 and 86 in series between this point and a point of reference potential, and by the connection of the primary winding 88 of a coupling transformer 96 in shunt with the capacitor 86, the capacitor 86 and winding 88 being resonant at the color subcarrier frequency. The secondary winding 92 has one end connected to a point of reference potential and the other to an output lead 94 for the chrominance signal. The circuit 84, 86, 88 has a low impedance to ground for intermediate frequencies so that tweets are not produced.

Reference is now made to FIG. 2 wherein a second detector circuit 102 is coupled to two cascaded luminance amplifying stages 104 and 106. An intermediate frequency carrier that is amplitude modulated in accordance with the composite video signal is applied by circuits, not shown, to a primary winding 108 of an intermediate frequency coupling transformer 100. The secondary winding 112 is tuned to parallel resonance within the band of intermediate frequencies representing the composite video signal by a capacitor 114 connected in shunt therewith. A unilateral conducting device, herein shown as a diode 116, is connected in series with a load resistor 118 across the secondary winding 112, and an intermediate frequency bypass capacitor 120 is connected in shunt with the load resistor 118. The diode 116 is so polarized that the composite video signal 122 is developed across the load resistor with the deflection synchronizing pulses at the diode end of the resistor extending in a positive direction with respect to the rest of the composite video signal.

The luminance amplification stage 104 is coupled to the second detector 102 in the following manner. Input electrodes, herein shown as a control grid 124 and a cathode 126 of the pentode amplifier 128 of the luminance amplification stage 104, are coupled to the output of the second detector circuit 102, a resistor 130 being inserted in series with the cathode 126 so as to improve the linearity through degeneration action. An amplified output with the deflection synchronizing pulses extending in a positive direction is obtained by the connection of a load resistor 132 between a point of reference potential and the end of the degeneration resistor 130 that is remote from the cathode 126. An output lead 134, connected to the junction of the resistors 130, 132 supplies the positive extending deflection synchronizing pulse to scanning synchronizing and automatic gain control systems 131 ad 135, respectively, of the receiver. A capacitor 133 for bypassing intermediate frequencies is connected between a point of reference potential and the end of the secondary winding 112 that is remote from the diode 116 in order that "tweets" can be minimized. This, of course, attenuates the high frequency components of the amplified signal produced across the load resistor 132, but does not adversely affect the low frequency synchronizing pulses on the lead 134 which are the only signal components of interest at this point in the circuit.

Approximately half of the amplification of the composite video signal required before its application to the cathodes of a cathode ray tube is produced by the pentode amplifier 128. The screen grid 138 is connected to a point 140 of positive operating potential, and the suppressor grid 142 is internally connected to the cathode 126. The anode load impedance for the anode 136 is comprised of terminating resistors 144 and 146 that are connected between opposite ends of a delay line 150 and the point 140 of positive potential. Peaking coils 152, 154 may be respectively connected in series with the load and terminating resistors 144, 146. One end of the delay line 150 is coupled to the anode 136 via a peaking circuit comprised of a parallel resistor 143 and inductance 145 that operates to increase the amplitude of the chrominance signals and which also neutralizes the capacitance of the chrominance take-off circuits to be described so as to enhance the amplitude of luminance signals having a lower frequency than the chrominance signals. The other end is coupled by a coupling capacitor 156 to an input electrode of the amplifier for the luminance amplification stage 106, herein shown as a control grid 158 of a pentode amplifier 160.

In order to at least partially restore the direct current component of the composite video signal which is lost because of the coupling capacitor 156, and to provide a suitable bias for the grid 158, advantage can be taken of the sound signal second detector circuit 162, which is normally present, by coupling it to the grid 158 via a biasing network. The sound second detector circuit is comprised of a winding 164 of a transformer 100 that is magnetically coupled to the primary winding 108, a shunt capacitor 166 for tuning the winding to resonance, a diode 168 and a load resistor 170 connected in series parallel relationship across the winding 164 and an intermediate frequency bypass capacitor 172 in shunt with the load resistor 170. A point of reference potential, herein shown as ground, is connected to the side of the detector circuit 102 that is connected to the end of the secondary winding 164 that is remote from the diode 168.

Response of the resonant circuit 164, 166 includes both the video and audio intermediate frequency carriers so that the beat frequency between them is produced across the load resistor 170 and applied via a lead 174 to the sound detection system of the receiver. Whereas the entire composite video signal is also produced at the diode end of the load resistor 170 with a polarity in which the synchronizing pulses extend in a negative direction, only the low frequency portion is desired for purposes of reinserting the direct current component. Consequently an isolating resistor 176 and a large bypass capacitor 178 are connected in series parallel relationship with the load resistor 170 to form a low pass filter such that the desired low frequency component of the composite video signal appears at their junction 180. This is supplied to the grid 158 by the connection of the junction 180 to one end of a resistive potentiometer 182 and the connection of the variable tap 184 thereof to the grid 158 via an isolation resistor 186.

Suitable bias for the grid 158 as well as control of brightness can be provided by connecting a resistor 188 between a point 190 of negative potential and the junction 180, and a resistor 192 between a point 194 of positive potential and the end of the potentiometer 182 that is remote from the junction 180. The tap 184 is then merely adjusted to the desired bias voltage. The values of the various resistors 170, 176, 182, 188 and 192 and/or the values of the potentials at the points 190, 194 can be selected so as to produce a zero bias on the diode 168.

The luminance amplification stage 106 is completed by the inclusion of a contrast control network 196 of well-known configuration between the cathode 198 of the pentode amplifier 160 and a point of reference potential; a connection including the parallel combination of a capacitor 200 and a resistor 202 between the point of positive operating potential 140 and the screen grid 204; and a connection of the anode 206 to a point 208 of positive potential via load impedances 210 and 212, which may be potentiometers connected in the manner shown so that selected portions of the composite video signal can be applied to the cathodes 214, 216 and 218 of the cathode ray tube 220.

Reference is now made once again to the amplification stage 104 for a description of the additional components for providing an amplified chrominance signal. A series circuit comprised of a resistor 226, a capacitor 228 and a primary winding 230 of a transformer 232 is connected between the anode 136 and a point of reference potential. The capacitor 228 and winding 230 are series resonant at the frequency of the color subcarrier and the resistor 226 adjusts the pass band of the series circuit to include the desired portion of the chrominance signals. A secondary winding 234 supplies the chrominance signals to the chrominance circuits of the receiver. The inductance 145 and the parallel resistor 143 present a higher load impedance for the chrominance signals at the anode 136 than would otherwise be the case so that the amplitude of these signals is increased. At lower frequencies the chroma take-off circuit 228, 230 is capacitance, and this is neutralized by the inductance 145.

The overall operation and advantages of the circuits of FIGS. 1 and 2 are generally the same and will now be discussed in connection with FIG. 1. Attention has already been called to the fact that in order to achieve maximum amplification of the composite video signal in the luminance channel with maximum economy it is desirable to operate the luminance amplifiers 38 and 68 over as wide a portion of their amplifying range as possible. Under such condition it will be found that signals at the anode 52, which are near an amplitude extreme and which represent the darker portions of the picture, are stretched and that the signals representing white near the other amplitude extreme are compressed. Just the reverse effect is produced by the pentode amplifier 68 so that the amplified composite video signal appearing at its anode 74 more nearly corresponds in shape to the input signal 32. In other words, the luminance amplifiers 38 and 68 are coupled in cascade relationship in such manner that their nonlinearities are in a compensating relationship.

In order that the polarity of the amplified composite video signal at the output of the luminance channel, i.e. at the anode 74, be such that the deflection synchronizing pulses extend in a positive voltage direction with respect to the other components of the video signal, the second detector circuit 10 is designed so as to produce at its output a composite video signal of the same polarity. The general practice is to use a second detector that produces a composite video signal of the opposite polarity in order that the pulses of noise, which always are in the same direction as the synchronizing pulses, will cut off the first luminance amplifier when they extend a given amount beyond the deflection synchronizing pulses. This reduces the amount of error that may be introduced in the operation of the deflection synchronizing and automatic gain control systems. However, in the circuits shown, the coupling between the second detector and the first luminance amplifier is such that the noise pulses tend to increase the flow of current therein rather than cut it off. The amount of increase is reduced by the degeneration of the biasing resistor 44.

An improved frequency response is obtained because the capacity to ground at the anode 52 is less than the capacity to ground of the cathode 42, the electrode which has been used in some video circuits for driving the delay line.

Furthermore, in the video circuits of the invention, where the time delay line 54 is connected to the anode 52, the second detector circuit 10 can be effectively grounded for intermediate frequencies, as by capacitors 84 and 86, so as to reduce the "tweets" that would otherwise be produced. If the delay line 54 were connected to the cathode 42, as in some other video circuits, the presence of such an alternating current ground would severely attenuate the higher video frequencies, thus requiring that an isolating impedance be inserted between the alternating current ground connection and the cathode.

In some portions of the specification, as well as in the claims, reference is made to the polarity of the synchronizing pulses as a convenient way of identifying the polarity of the signal, at certain points in the circuit, and it is not intended in all cases that the synchronizing pulses themselves are significant.

Whereas in the video circuits of FIGS. 1 and 2 the amplifiers are illustrated as being tubes, transistors could be utilized in accordance with the invention with, of course, appropriate changes in other circuit parameters.

What is claimed is:

1. In a color television receiver, video circuits for detecting and amplifying the various components of a composite video signal in such manner as to produce amplified composite video signal in which the deflection synchronizing components are more positive than the rest of the signal comprising in combination:

a first luminance amplifier having grid, a cathode, and an anode, a second detector circuit polarized to produce at its output a composite video signal having its deflection synchronizing pulses extending in a positive direction with respect to the other components of the signal, means for coupling the output of said second detector circuit to drive the grid of said first luminance amplifier, a point of positive operating potential, a load impedance connected between said anode and said point of positive potential, a second luminance amplifier having an anode, a grid and a cathode, a delay line coupled between said anode of said first luminance amplifier and said grid of said second luminance amplifier, a load impedance connected between said anode of said second luminance amplifier and a point of positive operating potential, a resistive divider coupled between the cathode of said first amplifier and a point of reference potential, a synchronizing system having an input coupled to said cathode of said first amplifier, and means for directing coupling a point on said divider remote from said reference potential to said second detector for providing a D.C. return path for said detector.

2. Video circuits for a color television receiver, comprising in combination:

a second detector circuit so polarized as to produce at its output a detected composite video signal in which the deflection synchronizing pulses are more positive than the rest of the signal, a first luminance amplifier having an anode, cathode, and control grid, a degeneration resistor and a cathode load resistor connected in series between said cathode and a point of reference potential, means coupling the output of said second detector circuit between said grid and the junction between said degeneration resistor and said load resistor with such polarity that said deflection synchronizing pulses drive said grid in a positive direction, an anode load resistor connected between said anode and a point of operating potential that is positive with respect to said point of reference potential, a second luminance amplifier having an anode, cathode, and control grid, means coupling a delay line between said anode of said first luminance amplifier and said grid of said second luminance amplifier, an anode load impedance connected between said anode of said second luminance amplifier and a point of positive operating potential, a third detector circuit so polarized to produce at its output a detected composite signal in which the deflection synchronizing pulses are more negative than the rest of the signal, means coupling said output of said third detector to said control grid of said second luminance amplifier for providing a negative D.C. potential in accordance with the amplitude of low frequency components of said composite signal for determining the D.C. operating point of said second amplifier.

3. Video circuits as set forth in claim 2 wherein a deflection synchronizing system is coupled to be directly energized by the video signals that appear across said cathode load resistor.

4. In a color television receiver adapted to respond to a carrier wave that is amplitude modulated with a composite video signal having deflection synchronizing pulses represented by an amplitude of the carrier wave that is greater than the amplitude of said wave representing the remainder of the composite video signal, the combination comprising:

a second detector circuit for providing at its output the composite video signal having deflection synchronizing pulses extending in a positive direction with respect to the other components of said signal, a first luminance amplification stage having an input, a first output at which a signal coupled to its input appears in amplified form and in a given polarity with respect to the signal applied to its input, and a second output at which a signal coupled to its input appears in amplified form but with an opposite polarity to the signal appearing at said first output, the transfer characteristic between said input and said first output being nonlinear such that the portion of said signal near a particular amplitude extreme is compressed in amplitude and the portion near the other amplitude extreme is expanded in amplitude, means coupling the output of said second detector to the input of said first luminance amplifier, a second luminance amplifier having an input and an output, the transfer characteristic between said input and output being nonlinear such that the portion of said signal near said other amplitude extreme is compressed and the portion near the said particular amplitude extreme is expanded, means including a time delay means coupling said first output of said first luminance amplification stage to said input of said second luminance amplification stage, a third detector circuit so polarized to produce at its output a detected composite signal in which the deflection synchronizing pulses are more negative than the rest of the signal, means coupling said output of said third detector to said input of said second luminance amplifier for providing a negative D.C. potential in accordance with the amplitude of low frequency components of said composite signal for determining the D.C. operating point of said second amplifier.

5. The combination as set forth in claim 4 wherein a synchronizing system is coupled to said second output.

References Cited

UNITED STATES PATENTS

| | | | |
|---|---|---|---|
| 2,375,551 | 5/1945 | Hallmark. | |
| 3,128,334 | 4/1964 | Heuer. | |
| 3,165,579 | 1/1965 | Stark et al. | |
| 3,328,519 | 6/1967 | Willis | 178—5.4 |

ROBERT L. GRIFFIN, Primary Examiner

A. H. EDDLEMAN, Assistant Examiner